(12) United States Patent
Gelberg et al.

(10) Patent No.: US 11,454,590 B2
(45) Date of Patent: Sep. 27, 2022

(54) MEASUREMENT TECHNIQUE FOR REFRACTIVE INDEX INHOMOGENEITY BETWEEN PLATES OF A LIGHTGUIDE OPTICAL ELEMENT (LOE)

(71) Applicant: Lumus Ltd., Ness Ziona (IL)

(72) Inventors: Jonathan Gelberg, Modiin (IL); Yuval Rubin, Ness Ziona (IL); Michael Adel, Ness Ziona (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 17/044,390

(22) PCT Filed: Jun. 20, 2019

(86) PCT No.: PCT/IB2019/055207
§ 371 (c)(1),
(2) Date: Oct. 1, 2020

(87) PCT Pub. No.: WO2019/244093
PCT Pub. Date: Dec. 26, 2019

(65) Prior Publication Data
US 2021/0116367 A1 Apr. 22, 2021

Related U.S. Application Data

(60) Provisional application No. 62/687,833, filed on Jun. 21, 2018.

(51) Int. Cl.
*G01N 21/45* (2006.01)
*G01J 9/02* (2006.01)
(Continued)

(52) U.S. Cl.
CPC ............ *G01N 21/45* (2013.01); *G01J 9/0215* (2013.01); *G01M 11/0228* (2013.01); *G01M 11/37* (2013.01)

(58) Field of Classification Search
CPC ....... G01N 21/45; G01N 23/04; G01J 9/0215; G01J 9/02; G01M 11/0228; G01M 11/37; G01M 11/35; G02B 21/00
See application file for complete search history.

(56) References Cited

U.S. PATENT DOCUMENTS 2,748,659 A * 6/1956 Schroder .............. G02B 27/283
359/489.06
3,969,023 A 7/1976 Brandt et al.
(Continued)

FOREIGN PATENT DOCUMENTS

CN 106054292 A 10/2016
CN 207216158 U 4/2018
(Continued)

OTHER PUBLICATIONS

Wei Chen et al.; "79-2; An Image Quality evaluation method of near eye display", SID Symposium Digest of Technical Papers, vol. 47, No. 1, May 1, 2016.

*Primary Examiner* — Mohamed K Amara
(74) *Attorney, Agent, or Firm* — Mark M. Friedman (57) ABSTRACT

A system and method for measuring refractive index inhomogeneity between plates of a Lightguide Optical Element (LOE) uses an innovative measuring technique based on a shearing interferometric technique conventionally used to observe interference and test the collimation of light beams. Another feature of the current implementation is an innovative method for analyzing the characteristics of the generated interferogram to characterize discrepancies between adjacent plates in an LOE.

17 Claims, 8 Drawing Sheets

(51) Int. Cl.
*G01M 11/02* (2006.01)
*G01M 11/00* (2006.01)

(56) References Cited

U.S. PATENT DOCUMENTS

| | | | |
|---|---|---|---|
| 4,685,803 A * | 8/1987 | Sommargren | G01N 21/45 356/484 |
| 4,720,189 A | 1/1988 | Heynen et al. | |
| 5,231,466 A * | 7/1993 | Erskine | G01N 21/45 356/128 |
| 5,920,392 A * | 7/1999 | Tsai | G01B 9/0207 356/498 |
| 6,879,443 B2 | 4/2005 | Spitzer et al. | |
| 7,612,879 B2 | 11/2009 | Stumpe et al. | |
| 7,724,409 B2 | 5/2010 | Lin et al. | |
| 8,016,428 B2 | 9/2011 | Kasazumi et al. | |
| 9,569,897 B2 | 2/2017 | Mitawaki et al. | |
| 9,638,920 B2 | 5/2017 | Bohn | |
| 2002/0186179 A1 | 12/2002 | Knowles | |
| 2003/0165017 A1 | 9/2003 | Amitai | |
| 2004/0032660 A1 | 2/2004 | Amitai | |
| 2004/0033528 A1 | 2/2004 | Amitai | |
| 2004/0080718 A1 | 4/2004 | Kojima | |
| 2004/0212775 A1 | 10/2004 | Faris | |
| 2005/0078388 A1 | 4/2005 | Amitai | |
| 2005/0083592 A1 | 4/2005 | Amitai | |
| 2005/0180687 A1 | 8/2005 | Amitai | |
| 2005/0281515 A1 | 12/2005 | Togami | |
| 2007/0082459 A1 * | 4/2007 | Faris | C12Q 1/6825 438/455 |
| 2007/0091445 A1 | 4/2007 | Amitai | |
| 2007/0097513 A1 | 5/2007 | Amitai | |
| 2007/0155277 A1 | 7/2007 | Amitai | |
| 2007/0165192 A1 | 7/2007 | Prior | |
| 2008/0025667 A1 | 1/2008 | Amitai | |
| 2008/0106775 A1 | 5/2008 | Amitai et al. | |
| 2008/0151379 A1 | 6/2008 | Amitai | |
| 2008/0186604 A1 | 8/2008 | Amitai | |
| 2008/0192239 A1 | 8/2008 | Otosaka | |
| 2008/0198471 A1 | 8/2008 | Amitai | |
| 2008/0278812 A1 | 11/2008 | Amitai | |
| 2008/0285140 A1 | 11/2008 | Amitai | |
| 2009/0052046 A1 | 2/2009 | Amitai | |
| 2009/0052047 A1 | 2/2009 | Amitai | |
| 2009/0097127 A1 | 4/2009 | Amitai | |
| 2009/0122414 A1 | 5/2009 | Amitai | |
| 2009/0153437 A1 | 6/2009 | Aharoni | |
| 2010/0077049 A1 | 3/2010 | Appelman et al. | |
| 2010/0171680 A1 | 7/2010 | Lapidot et al. | |
| 2010/0202048 A1 | 8/2010 | Amitai | |
| 2010/0214635 A1 | 8/2010 | Sasaki et al. | |
| 2011/0050547 A1 | 3/2011 | Mukawa | |
| 2011/0176218 A1 | 7/2011 | Noui | |
| 2011/0024890 A1 | 10/2011 | Miyawaki et al. | |
| 2011/0304828 A1 | 12/2011 | Khechana | |
| 2012/0069350 A1 * | 3/2012 | Sugimoto | G01N 21/41 356/128 |
| 2012/0179369 A1 | 7/2012 | Lapidot et al. | |
| 2012/0243002 A1 * | 9/2012 | Yu | G01N 21/45 356/517 |
| 2012/0248292 A1 * | 10/2012 | Ozcan | G03H 1/0866 250/208.1 |
| 2013/0229717 A1 | 9/2013 | Amitai | |
| 2013/0276960 A1 | 10/2013 | Amitai | |
| 2013/0279017 A1 | 10/2013 | Amitai | |
| 2014/0027232 A1 | 1/2014 | Mccollum | |
| 2014/0014065 A1 | 5/2014 | Brown et al. | |
| 2014/0118813 A1 | 5/2014 | Amitai et al. | |
| 2014/0118836 A1 | 5/2014 | Amitai et al. | |
| 2014/0118837 A1 | 5/2014 | Amitai et al. | |
| 2014/0126051 A1 | 5/2014 | Amitai et al. | |
| 2014/0126052 A1 | 5/2014 | Amitai et al. | |
| 2014/0126056 A1 | 5/2014 | Amitai et al. | |
| 2014/0126057 A1 | 5/2014 | Amitai et al. | |
| 2014/0126175 A1 | 5/2014 | Amitai et al. | |
| 2014/0168637 A1 * | 6/2014 | Wan | G01B 9/02022 356/73 |
| 2015/0138451 A1 | 5/2015 | Amitai | |
| 2015/0198805 A1 | 7/2015 | Mansharof et al. | |
| 2015/0205140 A1 | 7/2015 | Mansharof et al. | |
| 2015/0205141 A1 | 7/2015 | Mansharof et al. | |
| 2015/0233824 A1 | 8/2015 | Richards et al. | |
| 2015/0277127 A1 | 10/2015 | Amitai | |
| 2015/0293360 A1 | 10/2015 | Amitai | |
| 2015/0035481 A1 | 12/2015 | Hilkes et al. | |
| 2016/0062119 A1 | 3/2016 | Fitch et al. | |
| 2016/0116743 A1 | 4/2016 | Amitai | |
| 2016/0170212 A1 | 6/2016 | Amitai | |
| 2016/0170213 A1 | 6/2016 | Amitai | |
| 2016/0170214 A1 | 6/2016 | Amitai | |
| 2016/0187656 A1 | 6/2016 | Amitai | |
| 2016/0020965 A1 | 7/2016 | Popovich et al. | |
| 2016/0314564 A1 | 10/2016 | Jones | |
| 2016/0341964 A1 | 11/2016 | Amitai | |
| 2016/0349518 A1 | 12/2016 | Amitai et al. | |
| 2017/0003504 A1 | 1/2017 | Vallius | |
| 2017/0045744 A1 | 2/2017 | Amitai | |
| 2017/0052376 A1 | 2/2017 | Amitai | |
| 2017/0052377 A1 | 2/2017 | Amitai | |
| 2017/0122725 A1 | 5/2017 | Yeoh | |
| 2017/0146802 A1 | 5/2017 | Pletenetskyy | |
| 2017/0169747 A1 | 6/2017 | Richards et al. | |
| 2017/0205277 A1 | 7/2017 | Ohtsuki | |
| 2017/0336636 A1 | 11/2017 | Amitai et al. | |
| 2017/0353714 A1 | 12/2017 | Poulad et al. | |
| 2017/0357095 A1 | 12/2017 | Amitai | |
| 2017/0363799 A1 | 12/2017 | Ofir et al. | |
| 2018/0039082 A1 | 2/2018 | Amitai | |
| 2018/0067315 A1 | 3/2018 | Amitai et al. | |
| 2018/0157057 A1 | 6/2018 | Gelberg et al. | |
| 2018/0210202 A1 | 7/2018 | Danziger | |
| 2018/0267317 A1 | 9/2018 | Amitai | |
| 2018/0275384 A1 | 9/2018 | Danziger et al. | |
| 2018/0292592 A1 | 10/2018 | Danziger | |
| 2018/0292599 A1 | 10/2018 | Ofir et al. | |
| 2018/0373039 A1 | 12/2018 | Amitai | |
| 2019/0011710 A1 | 1/2019 | Amitai | |
| 2019/0056600 A1 | 2/2019 | Danziger et al. | |
| 2019/0064518 A1 | 2/2019 | Danziger | |
| 2019/0155035 A1 | 5/2019 | Amitai | |
| 2019/0159354 A1 | 5/2019 | Zheng et al. | |
| 2019/0170327 A1 | 6/2019 | Eisenfeld et al. | |
| 2019/0208187 A1 | 7/2019 | Danziger | |
| 2019/0212487 A1 | 7/2019 | Danziger et al. | |
| 2019/0227215 A1 | 7/2019 | Danziger et al. | |
| 2019/0278086 A1 | 9/2019 | Ofir | |
| 2019/0285900 A1 | 9/2019 | Amitai | |
| 2019/0293856 A1 | 9/2019 | Danziger | |
| 2019/0339530 A1 | 11/2019 | Amitai | |
| 2019/0346609 A1 | 11/2019 | Eisenfeld | |
| 2019/0361240 A1 | 11/2019 | Gelberg | |
| 2019/0361241 A1 | 11/2019 | Amitai | |
| 2019/0377187 A1 | 12/2019 | Rubin et al. | |
| 2019/0391408 A1 | 12/2019 | Mansharof | |
| 2020/0033572 A1 | 1/2020 | Danziger et al. | |
| 2020/0041713 A1 | 2/2020 | Danziger | |
| 2020/0089001 A1 | 3/2020 | Amitai et al. | |
| 2020/0110211 A1 | 4/2020 | Danziger et al. | |
| 2020/0120329 A1 | 4/2020 | Danziger | |
| 2020/0133008 A1 | 4/2020 | Amitai | |
| 2020/0150330 A1 | 5/2020 | Danziger et al. | |
| 2020/0183159 A1 | 6/2020 | Danziger | |
| 2020/0183170 A1 | 6/2020 | Amitai et al. | |
| 2020/0200963 A1 | 6/2020 | Eisenfeld et al. | |
| 2020/0209667 A1 | 7/2020 | Sharlin et al. | |
| 2020/0241308 A1 | 7/2020 | Danziger et al. | |
| 2020/0249481 A1 | 8/2020 | Danziger et al. | |
| 2020/0278557 A1 | 9/2020 | Greenstein et al. | |
| 2020/0285060 A1 | 9/2020 | Amitai | |
| 2020/0292417 A1 | 9/2020 | Lobachinsky et al. | |
| 2020/0292744 A1 | 9/2020 | Danziger | |
| 2020/0292819 A1 | 9/2020 | Danziger et al. | |
| 2020/0310024 A1 | 10/2020 | Danziger et al. | |
| 2020/0326545 A1 | 10/2020 | Amitai et al. | |

(56) References Cited

U.S. PATENT DOCUMENTS

| | | |
|---|---|---|
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0165231 A1 | 6/2021 | Gelberg et al. |
| 2021/0239898 A1 | 8/2021 | Danziger et al. |

FOREIGN PATENT DOCUMENTS

| | | | | |
|---|---|---|---|---|
| CN | 113508314 A | * | 10/2021 | ......... G02B 27/0172 |
| DE | 69825251 T2 | * | 12/2004 | ............... G02B 5/30 |
| EP | 1510812 A1 | * | 3/2005 | ............... G01J 9/02 |
| EP | 1930886 A1 | * | 6/2008 | ............... G03H 1/30 |
| JP | 2001021448 | | 1/2001 | |
| JP | 2013231652 | | 11/2013 | |

\* cited by examiner

MEASUREMENT TECHNIQUE FOR REFRACTIVE INDEX INHOMOGENEITY BETWEEN PLATES OF A LIGHTGUIDE OPTICAL ELEMENT (LOE)

FIELD OF THE INVENTION

The present invention generally relates to optical testing, and in particular, it concerns a non-contact measurement technique of refractive index differences.

BACKGROUND OF THE INVENTION

One of the manufacturing challenges in production of a Lightguide Optical Element (LOE) is achieving homogeneity of the refractive index. Inhomogeneity results in degradation in image quality. As rays cross the facets, particularly at large angles with respect to a normal to the facets, angular deviation will be introduced if the refractive indices of the individual plates are not sufficiently well matched.

SUMMARY

According to the teachings of the present embodiment there is provided a method for measuring refractive index inhomogeneity including the steps of: projecting projected light onto a front surface of a lightguide, the lightguide including: a first pair of external surfaces parallel to each other, the external surfaces including the front surface and a back surface, and a set of coated plates, the set of coated plates: parallel to each other, between the first pair of external surfaces, and at a non-parallel angle relative to the first pair of external surfaces, and each of the plates having a corresponding index of refraction, and capturing an interferogram image of an interference pattern to measure the refractive index inhomogeneity between the plates, the interference pattern between refracted/reflected light rays and externally reflected light, the refracted/reflected light rays being the result of the projected light traversing, reflecting internally, and then exiting the lightguide via the front surface and the externally reflected light being the result of the projected light reflecting from the front surface.

In an optional embodiment, the projecting is at an oblique angle relative to the front surface. In another optional embodiment, the projecting is normal relative to the front surface. In another optional embodiment, the interferogram image corresponds to refractive index inhomogeneity between the indices of refraction of the plates.

In another optional embodiment, further including: determining deviation between one or more portions of the fringes and another one or more portions of the fringes, each of the portions corresponding to one or more of the plates, the deviation corresponding to refractive index difference (inhomogeneity) between the indices of refraction of the plates.

According to the teachings of the present embodiment there is provided a method for determining refractive index inhomogeneity including the steps of: providing an interferogram, the interferogram including one or more fringes, the interferogram generated by: projecting projected light onto a front surface of a lightguide, the lightguide including: a first pair of external surfaces parallel to each other, the external surfaces including the front surface and a back surface, and a set of plates, the set of plates: parallel to each other, between the first pair of external surfaces, and at a non-parallel angle relative to the first pair of external surfaces, and each of the plates having a corresponding index of refraction, and capturing an interferogram image of an interference pattern to measure the refractive index inhomogeneity between the plates, the interference pattern between refracted/reflected light rays and externally reflected light, the refracted/reflected light rays being the result of the projected light traversing, reflecting internally, and then exiting the lightguide via the front surface and the externally reflected light being the result of the projected light reflecting from the front surface, and determining deviation between one or more portions of the fringes and another one or more portions of the fringes, each of the portions corresponding to one or more of the plates, the deviation corresponding to refractive index inhomogeneity between the indices of refraction of the plates.

In an optional embodiment, each of the portions of the fringes corresponds to one of the plates. In another optional embodiment, the deviation is between adjacent the plates. In another optional embodiment, the deviation is across multiple the plates. In another optional embodiment, the deviation is across all the plates.

In another optional embodiment, determining deviation includes determining how many fringe jumps are in the interferogram.

In another optional embodiment, further including a step of calculating a pass/fail metric based on the deviation.

In another optional embodiment, the deviation is determined using at least one technique selected from the group consisting of: analyzing the interferogram to determine axes of the interferogram, rotating and/or transforming the interferogram, splitting the interferogram into N discrete signal arrays orthogonal to the fringes, whereby N is significantly larger than the number of facets in the LOE, and calculating a phase of signal arrays n=1 to N, by use of a phase extraction algorithm selected from the group consisting of: three or four bucket method, and wavelet transform.

In another optional embodiment, a pass/fail metric is derived from the deviation determined over an entirety of the interferogram, and then other pass/fail metrics are derived from deviations between adjacent the plates.

In another optional embodiment, the deviation is determined by: splitting the interferogram into N discrete signal arrays orthogonal to the fringes, calculating a phase of the signal arrays n=1 to N, by use of a phase extraction algorithm, and plotting the phase as a function of n and determining maximum phase difference between overall maxima and minima in the phase plot.

In another optional embodiment, the deviation is determined: using a portion of one of the fringes, doing a best fit extrapolation to the portion of one of the fringes, and comparing the extrapolation to another portion of the fringes.

In another optional embodiment, the deviation is determined by: extrapolating one of the fringes to generate an ideal fringe, calculating a departure of an actual one of the fringes from the ideal fringe.

In another optional embodiment, the projected light is collimated light that has been slightly defocused. In another optional embodiment, the projected light is monochrome light. In another optional embodiment, the projected light is in the visible spectrum.

According to the teachings of the present embodiment there is provided a system for measuring refractive index inhomogeneity, the system including: a display source, collimating optics, a lightguide including: a first pair of external surfaces parallel to each other, the external surfaces including the front surface and a back surface, and a set of plates, the set of plates: parallel to each other, between the first pair of external surfaces, and at a non-parallel angle relative to the first pair of external surfaces, and each of the plates having a corresponding index of refraction, and a capture device deployed to capture an interferogram image of an interference pattern to measure the refractive index inhomogeneity between the plates, the interference pattern between refracted/reflected light rays and externally reflected light, the refracted/reflected light rays being the result of the projected light traversing, reflecting internally, and then exiting the lightguide via the front surface and the externally reflected light being the result of the projected light reflecting from the front surface.

In an optional embodiment, the system further including a processing system containing one or more processors, the processing system being configured to determining deviation between one or more portions of the fringes and another one or more portions of the fringes, each of the portions corresponding to one or more of the plates, the deviation corresponding to refractive index inhomogeneity between the indices of refraction of the plates.

According to the teachings of the present embodiment there is provided a system for determining refractive index inhomogeneity, the system including a processing system containing one or more processors, the processing system being configured to: process an interferogram, the interferogram including one or more fringes, the interferogram generated by: projecting projected light onto a front surface of a lightguide, the lightguide including: a first pair of external surfaces parallel to each other, the external surfaces including the front surface and a back surface, and a set of plates, the set of plates: parallel to each other, between the first pair of external surfaces, and at a non-parallel angle relative to the first pair of external surfaces, and each of the plates having a corresponding index of refraction, and capturing an interferogram image of an interference pattern to measure the refractive index inhomogeneity between the plates, the interference pattern between refracted/reflected light rays and externally reflected light, the refracted/reflected light rays being the result of the projected light traversing, reflecting internally, and then exiting the lightguide via the front surface and the externally reflected light being the result of the projected light reflecting from the front surface, and determine deviation between one or more portions of the fringes and another one or more portions of the fringes, each of the portions corresponding to one or more of the plates, the deviation corresponding to refractive index inhomogeneity between the indices of refraction of the plates.

According to the teachings of the present embodiment there is provided a non-transitory computer-readable storage medium having embedded thereon computer-readable code for measuring refractive index inhomogeneity, the computer-readable code including program code for: performing any of the above methods According to the teachings of the present embodiment there is provided non-transitory computer-readable storage medium having embedded thereon computer-readable code for determining refractive index inhomogeneity, the computer-readable code including program code for: performing any of the above methods.

According to the teachings of the present embodiment there is provided computer program that can be loaded onto a server connected through a network to a client computer, so that the server running the computer program constitutes a processing system in a system according to any of the above disclosures.

BRIEF DESCRIPTION OF FIGURES

The embodiment is herein described, by way of example only, with reference to the accompanying drawings, wherein.

ABBREVIATIONS AND DEFINITIONS

For convenience of reference, this section contains a brief list of abbreviations, acronyms, and short definitions used in this document. This section should not be considered limiting. Fuller descriptions can be found below, and in the applicable Standards.

1D—one-dimensional
2D—two-dimensional
CCD—charge coupled device
CRT—cathode ray tube
DMD—digital micro-mirror device
EMB—eye-motion-box
FOV—field-of-view
HMD—head-mounted display
HUD—head-up display
LCD—liquid crystal display
LCoS—liquid crystal on silicon
LED—light emitting diode
LOE—light-guide optical element
OLED—organic light emitting diode array
OPL—optical path length
SLM—spatial light modulator
TR—total internal reflection

DETAILED DESCRIPTION

The principles and operation of the system according to a present embodiment may be better understood with reference to the drawings and the accompanying description. A present invention is a system and method for measuring refractive index inhomogeneity between plates of a Lightguide Optical Element (LOE). An innovative measuring technique is based on the well-known shearing interferometric technique conventionally used to observe interference and test the collimation of light beams. Another feature of the current implementation is an innovative method for analyzing the characteristics of the generated interferogram to characterize discrepancies between adjacent plates in an LOE.

One of the manufacturing challenges in production of an LOE is achieving homogeneity of the refractive index. Inhomogeneity results in degradation in image quality. As rays cross the facets, particularly at large angles with respect to a normal to the facets, angular deviation will be introduced if the refractive indices of the individual plates are not sufficiently well matched.

Basic Technology—FIG. 1 to FIG. 7

Figure 1:
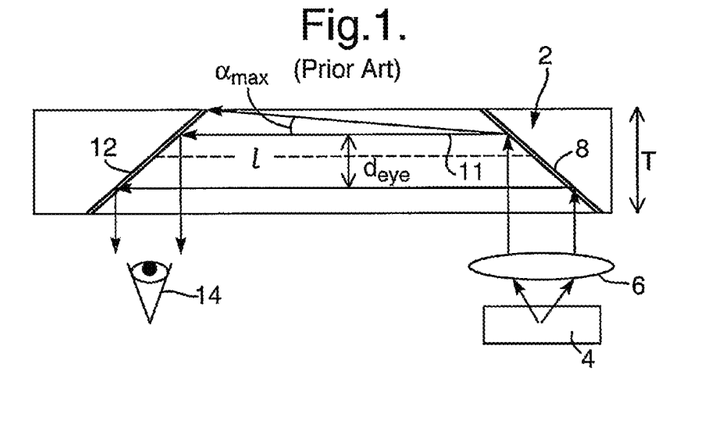
FIG. 1 illustrates a conventional prior art folding optics arrangement.

FIG. 1 illustrates a conventional prior art folding optics arrangement, wherein the substrate 2 receives light from a display source 4. The display is collimated by collimating optics 6, e.g., a lens. The light from the display source 4 is coupled into substrate 2 by a first reflecting surface 8, in such a way that the main ray 11 is parallel to the substrate plane. A second reflecting surface 12 couples the light out of the substrate and into the eye of a viewer 14. Despite the compactness of this configuration, this configuration suffers significant drawbacks. In particular, only a very limited FOV and Eye Motion Box (EMB) can be achieved.

Figure 2:
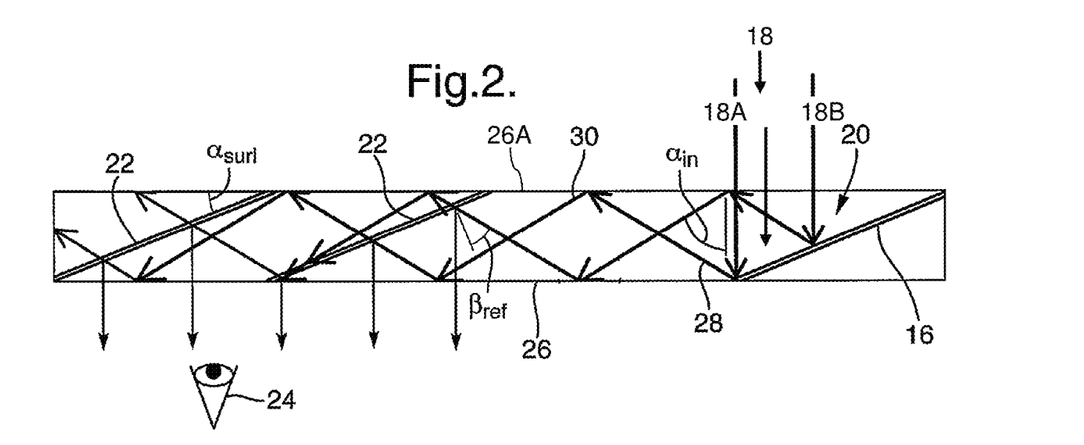
FIG. 2 is a side view of an exemplary light-guide optical element (LOE).

Refer now to FIG. 2 is a side view of an exemplary light-guide optical element (LOE). To alleviate the above limitations, an array of selectively reflecting surfaces can be used, fabricated within a light-guide optical element (LOE). The first reflecting surface 16 is illuminated by a collimated display light ray (incoming light ray beams) 18 emanating from a light source (not shown) located behind the device. For simplicity in the current figures, only one light ray is generally depicted, the incoming light ray 18 (also referred to as the "beam" or the "incoming ray"). Other rays of incoming light, such as beams 18A and 18B may be used to designate edges of the incident pupil, such as a left and right edge of an incoming light pupil. Generally, wherever an image is represented herein by a light beam, it should be noted that the beam is a sample beam of the image, which typically is formed by multiple beams at slightly differing angles each corresponding to a point or pixel of the image. Except where specifically referred to as an extremity of the image, the beams illustrated are typically a centroid of the image.

The reflecting surface 16 is typically 100% reflecting (full mirror) and reflects the incident light from the source such that the light is trapped inside a lightguide 20 by total internal reflection. The lightguide 20 is also referred to as a "planar substrate" and a "light-transmitting substrate". The lightguide 20 includes at least two (major) surfaces parallel to each other, shown in the current figure as a first (back, major) surface 26 and a second (front, major) surface 26A. Note that the designation of "first" and "second" with regard to the major surfaces (26, 26A) is for convenience of reference. Coupling-in to the lightguide can be from various surfaces, such as the front, back, side edge, or any other desired coupling-in geometry.

Incoming light ray 18 enters the substrate at a proximal end of the substrate (right side of the figure). Light propagates through the lightguide and one or more facets, normally at least a plurality of facets, and typically several, more than 3 or 4 facets, toward a distal end of the lightguide (left side of the figure). Light propagates through the light-guide in both an initially reflected direction 28 of propagation, and another direction 30 of propagation.

The trapped light propagates through the lightguide, reflecting off the internal surfaces of the substrate 20 and traversing an array of selectively reflecting surfaces 22. The selectively reflecting surfaces 22 are typically partially reflecting coupling-out facets, each of which couples a portion of the light out of the substrate into the eye 24 of a viewer Internal, partially reflecting surfaces, such as selectively reflecting surfaces 22 are generally referred to in the context of this document as "facets". For augmented reality applications, the facets are partially reflecting, allowing light from the real world to enter via front surface 26A, traverse the substrate including facets, and exit the substrate via back surface 26 to the eye 24 of the viewer. The partial reflecting of the facets also allows a portion of the propagating light to continue propagating to subsequent facets. The internal partially reflecting surfaces 22 generally at least partially traverse the lightguide 20 at an oblique angle (i.e., neither parallel nor perpendicular) to the direction of elongation of the lightguide 20. Partial reflection can be implemented by a variety of techniques, including, but not limited to transmission of a percentage of light, and/or use of polarization.

Figure 3A:
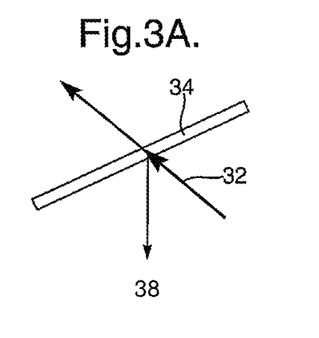
FIG. 3A and FIG. 3B illustrate a desired reflectance behavior of selectively reflecting surfaces.
Figure 3B:
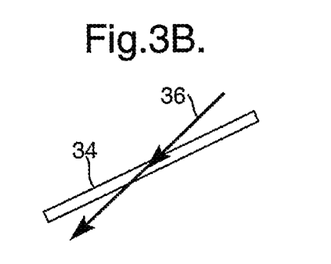

FIGS. 3A and 3B illustrate a desired reflectance behavior of selectively reflecting surfaces. In FIG. 3A, the ray 32 is partially reflected from facet 34 and coupled out 38 of the substrate 20. In FIG. 3B, the ray 36 is transmitted through the facet 34 without any notable reflection.

Figure 4:
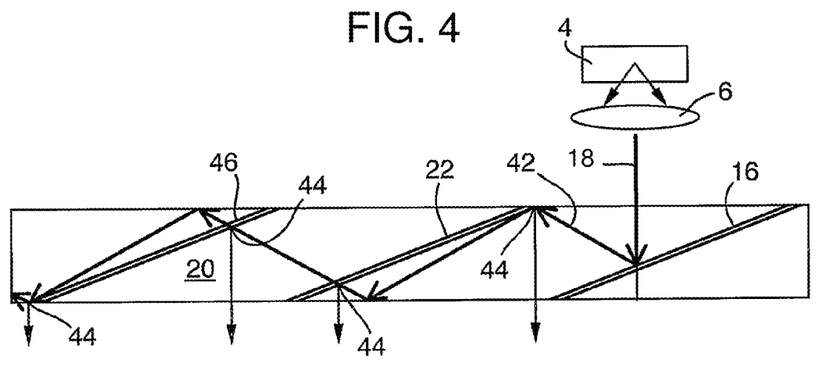
FIG. 4 is a detailed sectional view of an array of selectively reflective surfaces that couple light into a substrate, and then out into the eye of a viewer.

FIG. 4 is a detailed sectional view of an array of selectively reflective surfaces that couple light into a substrate, and then out into the eye of a viewer. As can be seen, a ray 18 from the light source 4 impinges on the first reflecting surface 16 and reflected ray 42 is coupled into the substrate by total internal reflection. The trapped ray is gradually coupled out from the substrate by the other two exemplary partially reflecting surfaces 22 at the points 44. The coating characteristics of the first reflecting surface 16 is not necessarily similar to that of the other reflecting surfaces 22, 46. This coating can be fully reflective, or a beam-splitter, either metallic, dichroic or hybrid metallic-dichroic.

Figure 5:
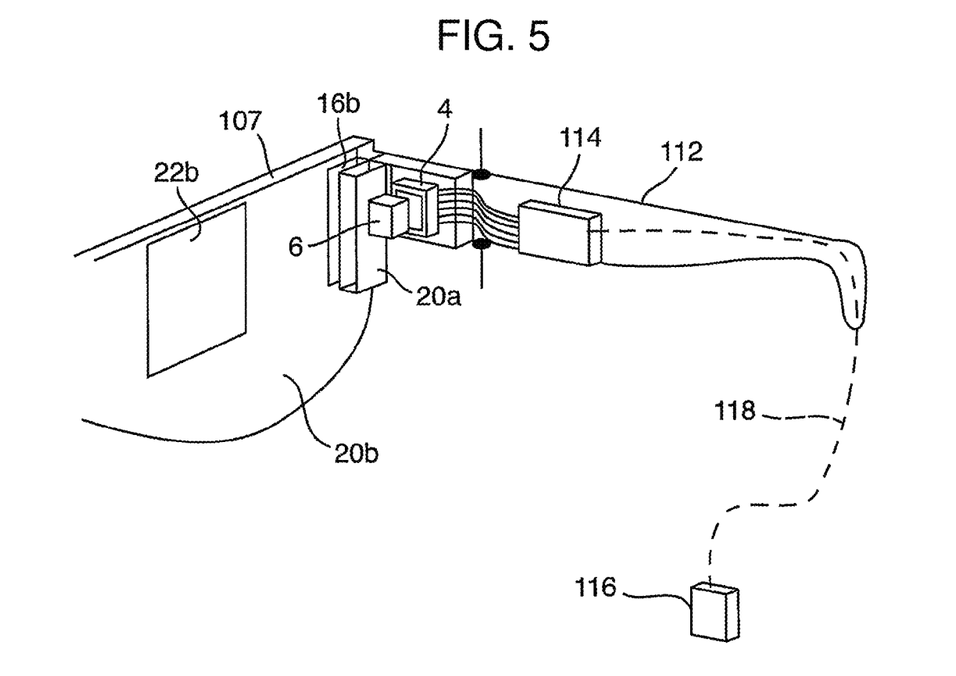
FIG. 5 illustrates an example of LOEs embedded in a standard eyeglasses frame.

FIG. 5 illustrates an example of LOEs 20a/20a' and 20b embedded in a standard eyeglasses frame 107. The display source 4, and the folding and the collimating optics 6 are assembled inside the arm portions 112 of the eyeglasses frame, just next to LOE 20a/20a', which is located at the edge of the second LOE 20b. For a case in which the display source is an electronic element, such as a small CRT, liquid crystal display (LCD), liquid crystal on silicon (LCoS), a digital micro-mirror device (DMD), a micro-LED array, or OLED, the driving electronics 114 for the display source might be assembled inside the back portion of the arm 112. A power supply and data interface 116 is connectable to arm 112 by a lead 118 or other communication means including radio or optical transmission. Alternatively, a battery and miniature data link electronics can be integrated in the eyeglasses frame. The current figure is an example, and other possible head-mounted displays arrangements can be constructed, including assemblies wherein the display source is mounted parallel to the LOE plane, or in the front part of the LOE.

Additional details of this basic technology can be found in U.S. Pat. No. 7,643,214.

Figure 6:
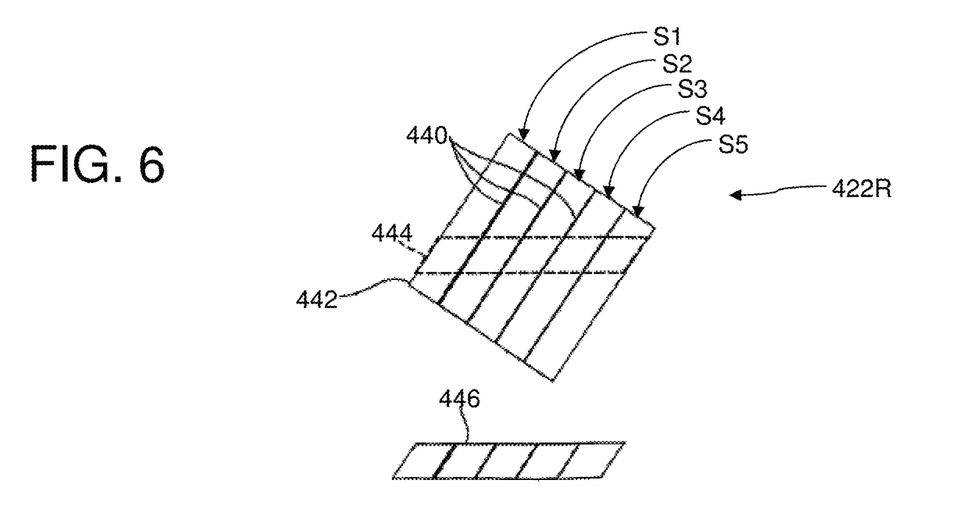
FIG. 6 illustrates a method for fabricating an array of selectively reflecting surfaces.

FIG. 6 illustrates a method of fabricating an array of partially reflecting surfaces. The surfaces of a plurality of transparent flat plates (422R, shown as five exemplary plates S1 to S5) are coated with the required coatings 440 and then the plates (S1 to S5) are cemented together so as to create a stack form 442. A segment 444 is then sliced off the stack form by cutting, grinding, and polishing, to create the desired array of reflecting surfaces 446, which can then be assembled with other elements to materialize the entire LOE. More than one array 446 can be fabricate of each segment 444, according to the actual size of the coated plates (S1 to S5) and the required size of the LOE.

Figure 7:
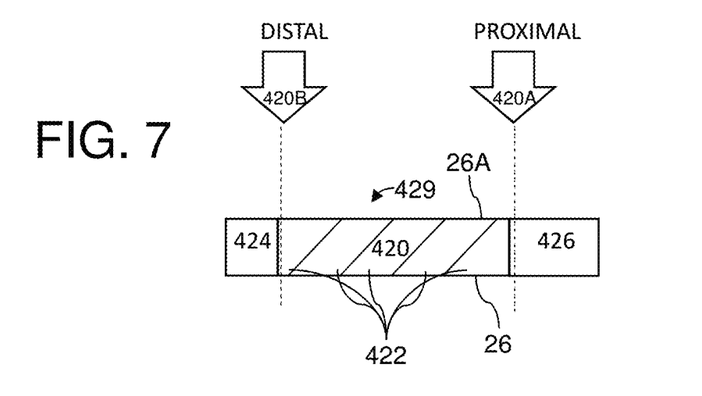
FIG. 7 is further details of a method for fabricating an array of selectively reflecting surfaces.

FIG. 7 is further details of a method for fabricating an array of selectively reflecting surfaces. The sliced lightguide 446 is cut, for example, perpendicular along both sides, along the dashed line 420A at what will become the proximal end of the lightguide, and cut along the dashed line 420B at what will become the distal end of the lightguide. This produces lightguide 420. Optionally, lightguides 424 and 426 are attached respectively to the proximal and distal ends of the lightguide 420 and the combination (of 420, 424, and 426) polished to produce lightguide (LOE) 429. Alternatively, the end plates (S1 and S5) can be thicker than the middle plates (S2, S3, S4), resulting in the sliced lightguide 446 having a structure similar to lightguide 429, with the area of attached lightguides 424 and 426 coming from the end plates (S1 and S5).

In general, each of the original transparent flat plates 422R results in a plate of a set of coated plates 422. Each of the plates 422 has three pairs of faces, each pair of faces parallel external surfaces of the plate. One pair of faces (shown as left and right sides in the current figure) are coated and cemented to adjoining plates to form a major axis of the lightguide (LOE). Another pair of faces (the "ends", shown at the top and bottom in the current figure) are then respectively grinded and polished to form the major external surfaces (including the front surface 26A and a back surface 26. The set of coated plates includes facets created where the plates meet, thus the set of plates includes a set of facets. The set of facets are parallel to each other, between the pair of major external surfaces (26A, 26), and at a non-parallel angle relative to the major external surfaces (26A, 26).

While the current figure shows an LOE with non-overlapping facets, this is not limiting, and implementations of the current invention can also be applied to overlapping facets, such as double- and triple-overlapping (not shown, refer to PCT/IL2018/050025 filed 8 Jan. 2018, which is incorporated by reference in its entirety herein).

Detailed Description—First Embodiment FIG. 8 to FIG. 15

Figure 8:
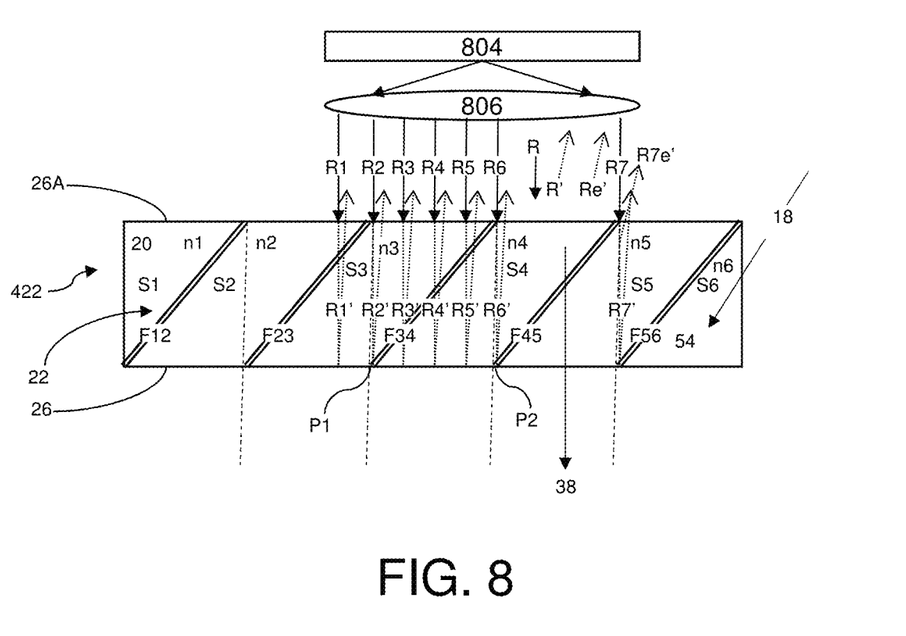
FIG. 8 is a sketch of an exemplary portion of testing for an LOE
Figure 9:
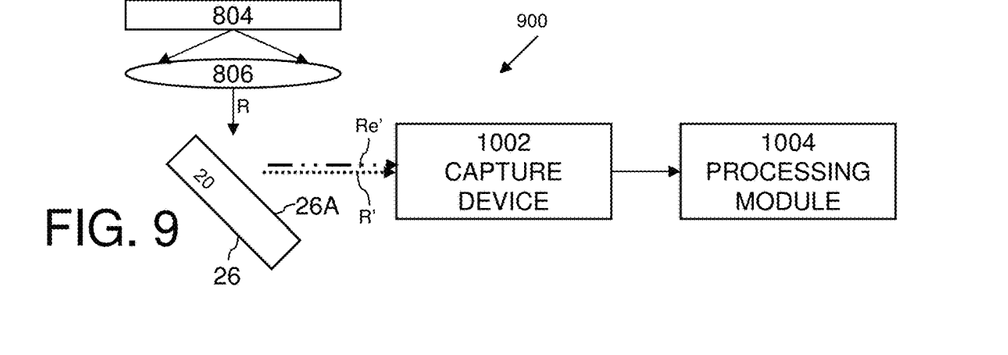
FIG. 9 is a high-level side-view sketch of an exemplary test setup.
Figure 10A:
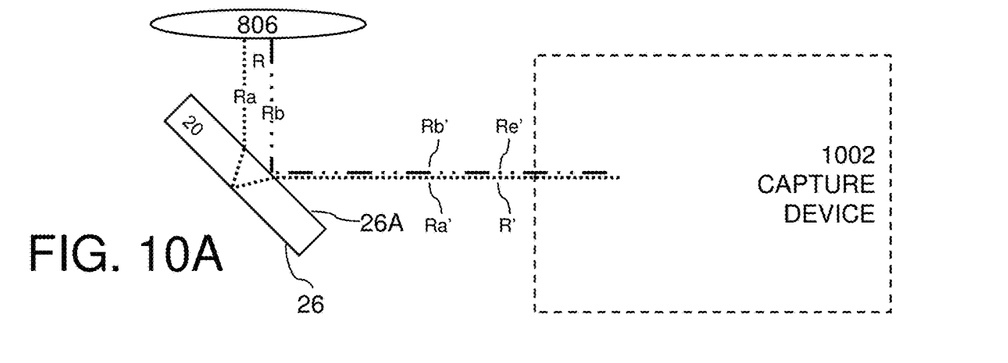
FIG. 10A is a side-view sketch of how fringes are formed.
Figure 10B:
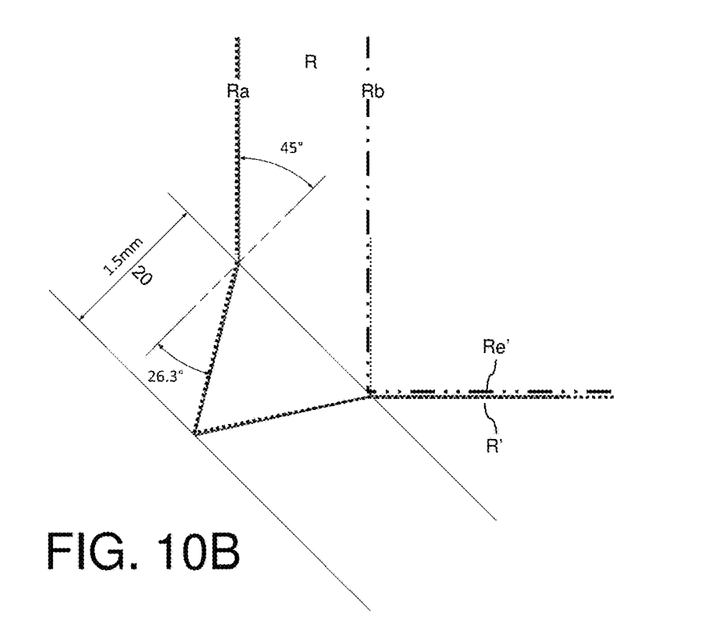
FIG. 10B is a detailed sketch of interference.

Refer now to FIG. 8, a sketch of an exemplary portion of testing for an LOE lightguide 20. The current exemplary implementation uses an LOE, as described above with reference to FIG. 2. In operation, the incoming light ray 18 can enter the LOE 20 at the proximal end 54. In the current test setup, display source 804 outputs light to collimating optics 806, as is known in the art to produce light rays for testing, shown as test light rays of projected light R. The test light rays (projected light R) can be collimated, but are typically not strictly collimated, but slightly defocused to produce the projected light R for testing. The testing is preferably performed using monochrome light (that is, a single wavelength of light), but can be performed with any wavelength, typically in the visible spectrum. This implementation is not limiting, and other wavelengths can be used, for example, infrared. For orientation, in the current figure, the front surface 26A is toward the incoming light rays R, typically at an angle as shown in the below figures (FIG. 9 to FIG. 10B). In this case, the incoming light rays are coming out of the page, at a downward angle to the front surface 26A of the LOE 20. The projected light R is typically projected toward the front surface 26A at an oblique angle relative to the front surface 26A as shown in the figures. This exemplary implementation is not limiting, and the projected light R can alternatively be projected toward the front surface 26A normal relative to the front surface 26A Refracted/reflected light rays R' and externally reflected rays Re' propagate away from the front surface 26A out of the page, at an upward angle. This can be better understood by viewing a test set up 900 in FIG. 9 (described below).

The test light rays R are shown as exemplary test light rays R1 to R7 that traverse and exit the LOE as respective exemplary refracted/reflected light rays R', shown as R1' to R7'. LOE lightguide 20 includes facets 22, which are shown as double-lines, between the major surfaces (the front surface 26A and the back surface 26). Note that the path of refracted/reflected light rays R1' to R7' is simplified for clarity. As described below, the optical path length of each of the refracted/reflected rays R' at the facets 22 will vary due to mismatching (inhomogeneity) between plates on either side of a facet.

The test light rays R will also be reflected by the external surface (front surface 26A) as externally reflected light Re'. For clarity, only one exemplary ray of externally reflected light R7e' is shown in the current figure, (for clarity, obviously not at the correct angle of reflection).

Shown in the current figure are plates 422 including exemplary plate-1 S1 having a first index of refraction $n_1$, plate-2 S2 having a second index of refraction $n_2$, plate-3 S3 having a third index of refraction $n_3$, plate-4 S4 having a fourth index of refraction $n_4$, plate-5 S5 having a fifth index of refraction $n_5$, and plate-6 S6 having a sixth index of refraction $n_6$. Also shown are exemplary facets: facet F12 between plate-1 S1 and plate-2 S2, facet F23 between plate-2 S2 and plate-3 S3, facet F34 between plate-3 S3 and plate-4 S4, facet F45 between plate-4 S4 and plate-5 S5, and facet F56 between plate-5 S5 and plate-6 S6. Alternatively, the plates can be described as being between the facets, for example, plate-2 S2 is between facet F12 and facet F23.

Ideally, the indices of refraction of each plate should match, that is, the indices should be homogeneous: $n_1=n_2=n_3=n_4=n_5=n_6$. However, in reality there is typically some variation between one or more indices. In an exemplary case, a first group ($n_1$, $n_2$, $n_4$, $n_6$) all have different indices, and a second ($n_3$, $n_5$) both have the same index that is also different from the index of the first group. In the current case, test ray R1 will traverse 20% of the LOE via plate-2 S2 having refractive index n2, refract at facet F23 to traverse 80% (the remaining width) via plate-3 S3 having refractive index n3, reflect from back surface 26 as refracted/reflected ray R1' traversing 80% of the LOE via plate-3 S3 having refractive index n3, refract at facet F23 to traverse the remaining 20% of the width of the LOE via plate-2 S2 having refractive index n2, and exit the LOE via the front surface 26A.

Similarly, test rays R2-R7 will traverse the LOE as respective reflected rays R2'-R7' as follows (corresponding refractive indices in parenthesis for each plate, only one direction described):

R2 as R2' 100% via plate-3 S3 (n3),
R3 as R3' 80% via plate-3 S3 (n3) and 20% via plate-4 S4 (n4),
R4 as R4' 50% via plate-3 S3 (n3) and 50% via plate-4 S4 (n4),
R5 as R5' 20% via plate-3 S3 (n3) and 80% via plate-4 S4 (n4), R6 as R6' 100% via plate-4 S4 (n4), and
R7 as R7' 100% via plate-5 S5 (n5).

In the current case as $n_3=n_5$, the effective optical path length, and hence the phase difference between parts of the rays reflected from the front surface 26A and the back surface 26, of test rays R2 and R7 (and corresponding refracted/reflected rays R2' and R7') should be similar. However, the optical path length and the resulting phase difference of test rays R2 to R6 should vary, as the proportion of inhomogeneous substrate (plates) varies.

Refer now to FIG. 9, a high-level side-view sketch of an exemplary test setup. A test set up 900 shows an exemplary configuration for testing. For clarity in the figures, the externally reflected light Re' is shown using a dash-double-dot line and refracted/reflected light rays R' are shown using a dotted line. Display source 804 outputs light to collimating optics 806, to produce test light rays R. Refracted/reflected light rays R', are output from the LOE 20 and received by a capture device 1002. Externally reflected light Re' is reflected from the external surface of the LOE 20 and received by the capture device 1002. The capture device 1002 captures an image of the resultant interference signal between the refracted/reflected light rays R' and the externally reflected light Re'. For convenience, the interferogram image resulting from the refracted/reflected light rays R' and captured by the capture device 1002 will be referred to in this description as an interferogram, a pattern formed by wave interference, especially one represented in a photograph or diagram, as explained below.

The interference pattern is used to measure the refractive index inhomogeneity between the plates 422. The interference pattern is between the refracted/reflected light rays (R') and the externally reflected light (Re'). The refracted/reflected light rays (R') being the result of the projected light R traversing, reflecting internally, and then exiting the lightguide 20 via the front surface 26A. The externally reflected light (Re') being the result of the projected light R reflecting from the front surface 26A. from the front surface 26A.

The capture device can include a variety of implementations, as convenient and sufficient for the specific desired testing. For example, the interference signal (light rays R', Re') can be projected onto a screen and a hand-held camera used to take a picture of the resulting interferogram. In another example, a CCD (charge coupled device) can be positioned to directly capture the interference of the light rays (R', Re'). The interferogram is optionally stored and processed by a processing module 1004.

Refer now to FIG. 10A, a side-view sketch of how fringes are formed. Fringes are formed when reference light rays (projected test light rays R) reflecting off the first LOE 20 front surface 26A (externally reflected light Re') interfere with the corresponding refracted/reflected rays R' (that pass into the LOE 20, reflect off the back surface 26) and then pass out of the LOE 20 to a screen (capture device 1002). In the current figure, exemplary portions of reference test light ray R) are shown as a first portion Ra and a second portion Rb. The first portion Ra traverses, reflecting, refracting, and exits the LOE 20 as reflected ray Ra'. The second portion Rb reflects off of the external front surface 26a of the LOE 20 as externally reflected ray Rb'. Fringes are observed when the exiting beam from the (auto-) collimator system (test rays R) is slightly defocused. Defocusing of the collimator 806 does not affect the relative change in fringe deviation. Greater defocusing of the collimator 806 will result in more fringes closer together, as compared to a less defocused collimator 806 that will result in relatively less fringes that are further apart. If the collimator is not defocused, the resulting generated interferogram will be a single fringe, that is, all one shade. In general, the collimator 806 is adjusted (defocused) enough to observe enough fringes to identify fringe jumps, but not adjusted (defocused) too much as the fringes will increase in number and become closer together and change in the shape of the fringe (their form) will be discernable. Generally, the external surfaces (front surface 26A and back surface 26) of the lightguide 20 are machined to high accuracy, and do not contribute to the fringes.

For reference, the FIG. 8 rays R1 to R7 are "stacked" into the page as drawn in FIG. 10A, wherein the view of the LOE 20 in current FIG. 10A is from the left side of the LOE 20 of FIG. 8.

Refer now to FIG. 10B, a detailed sketch of interference. The appearance of the signal on the screen (captured image) is an indication of the optical path difference between the externally reflecting rays Re' (dash-double-dot line) and reflected/refracted rays R' (dotted line) rays of the current figure. The current figure is an example of the refraction at the interface between air and S-TIM8 glass (n=1.5955), hence the refraction angle of 26.3° inside the LOE 20.

Figure 11:
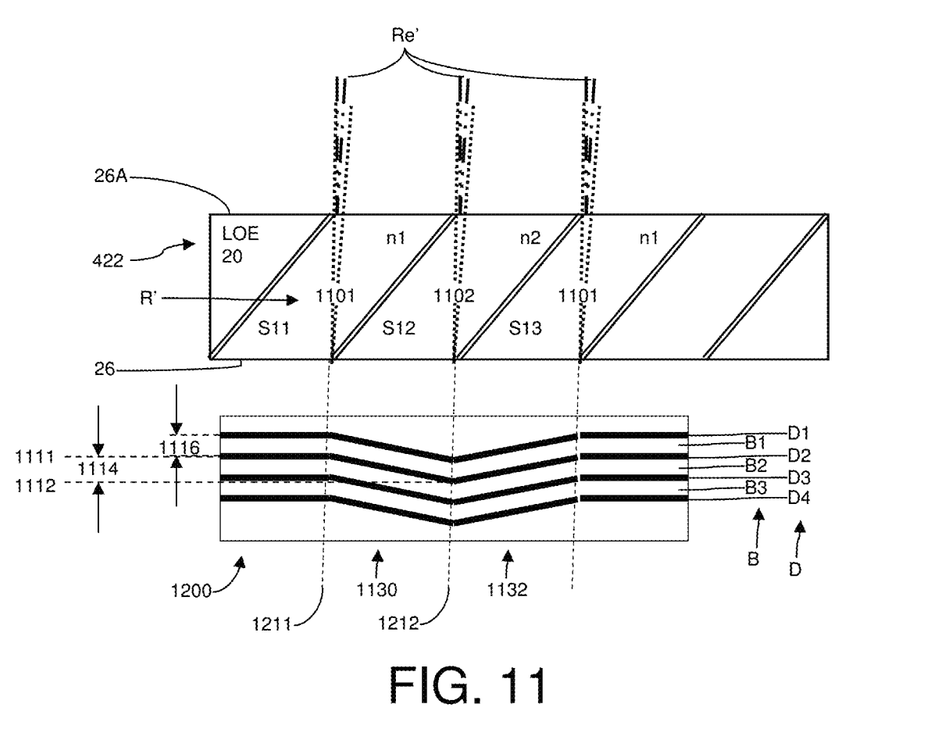
FIG. 11 is a sketch of producing an overall pattern for various regions of the LOE.

Refer now to FIG. 11, a sketch of producing an overall pattern for various regions of the LOE. As the fringe pattern includes interference between light which does not pass through the LOE 20 (externally reflected light Re') with light that does pass through the LOE 20 (refracted/reflected light rays R'), the overall pattern reveals comparative information for rays that pass through various regions of the LOE 20, i.e. different plates. In the current figure, plates S11, S12, S13 have respective refractive indices ($n_1$, $n_2$, $n_1$). This is depicted in the current figure wherein ray paths 1101 and ray path 1102 traverse the LOE 20 through different plates of potentially different refractive indices. The current figure shows these rays (1101, 1102). In the orientation of previous FIG. 10B, ray paths 1101 and ray paths 1102 overlap, and are shown as reflected/refracted rays R'. The resulting interferogram 1200 shows optical path differences between the externally reflecting rays Re' and the reflected/refracted 1101/1102 rays as bands B, or "fringes" between black or dark areas D. Three exemplary bands are shown, B1, B2, B3 between four exemplary dark areas, D1, D2, D3, D4. In a case where a helium-neon red laser source is used, the bands B will be red color between black areas D. Alternatively, grayscale or black/white images can be used, such as the current black areas D and white fringes B of the current figure.

A fringe (band B) is a region extending from the center of a dark area of an interferogram, through a light region and back to the center of the next dark region. For example, fringe B1 is a light region between dark area D1 and dark area D2. A light region occurs when rays from two distinct paths coincide and are in-phase with each other. That is, the rays' optical path lengths are separated by a whole number of wavelengths and constructive interference occurs. Accordingly, a region when rays from two distinct paths coincide and are out-of-phase with each other, that is, separated by (n+1/2) wavelengths, destructive interference occurs and the region will be dark. Therefore, the resultant fringe pattern is a direct indictor of relative path length in the LOE, which is in turn an indicator of change in refractive index.

In the current figure, the fringes are generally horizontal bands, corresponding to the alignment along a major axis of the LOE 20. Two slopes are shown: Slope 1130 corresponding to the area of the LOE 20 for plate S11 and S12, and slope 1132 corresponding to the area of the LOE 20 for plate S12 and plate S13. The slopes in the interferogram 1200 represent areas where the ray path (reflected/refracted rays R', as described in reference to FIG. 8) is gradually split between two plates (varying proportions of $n_1$ and $n_2$ in the current figure). The line marked as 1211 defines the characteristics of $n_1$ (plate S11 having refractive index $n_1$, where a ray traverses the LOE via 100% of plate S11, that is, 100% $n_1$). Similarly, the line marked as 1212 defines the characteristics of $n_2$ (plate S12 having refractive index $n_2$, where a refracted/reflected ray traverses the LOE via 100% of plate S12/100% $n_2$).

If there is a difference between the refractive indices of the plates (S11, S12, S13), then the 1101/1102 rays will have a difference optical path length (OPL) and the change in phase will be reflected in a deviation in the fringe pattern. This difference between characteristics of (typically adjoining) plates is referred to as a "fringe jump". The fringe jump can be seen in the interferogram 1200 by a vertical difference between one portion of a fringe at a first horizontal location and another portion of a fringe at another horizontal location. A non-limiting example can be seen from exemplary fringe B2 having a fringe jump 1114. In general, the fringes (fringe sizes, fringe widths) will all be the same size as shown by fringe size 1116. In general, the fringe size and fringe jumps can be measured from any point in the fringe, for example, from a mid-point of the dark area D or the mid-point of a fringe B. In the current example, the fringe jump 1114 is measured from a first portion having a first point 1111 at line 1211 to a second portion having a second point 1112 at line 1212. In this case, the optical path length difference from plate S11 to plate S12 results in approximately a difference between fringes of one fringe (a fringe jump 1114 of one fringe 1116).

As an exemplary calculation, what would be the difference in fringes for adjacent plates having an inhomogeneity of $1\times10-4$?

The refracted angles inside the materials are calculated from the following:

$$\sin\theta_1 = \frac{\sin 45°}{n_1}$$

$$\sin\theta_2 = \frac{\sin 45°}{n_2}$$

where $\theta_1$ is the refracted angle at plates of $n_1$ and $\theta_2$ is the refracted angle at plates of $n_2$.

The difference in optical path length between the paths in these adjacent plates would then be:

$$\Delta \text{Optical path} = 2\frac{d}{\cos\theta_2}n_2 - 2\frac{d}{\cos\theta_1}n_1 = m\lambda$$

Where d is the slice thickness (width of LOE 20), m is the number of resultant fringe jumps, and $\lambda$ is the wavelength of the test light rays R.

For the parameters $n_1=1.5955$ $n_2=1.5956$ $d=1.5$ mm $\Delta n=1\cdot 10^{-4}$ $\lambda=632.8\cdot 10^{-9}$ $\rightarrow$m=0.40

Therefore, refractive index inhomogeneity in plates of $1\times 10^4$ would manifest in a fringe jump of 0.40 fringes.

Figure 12:
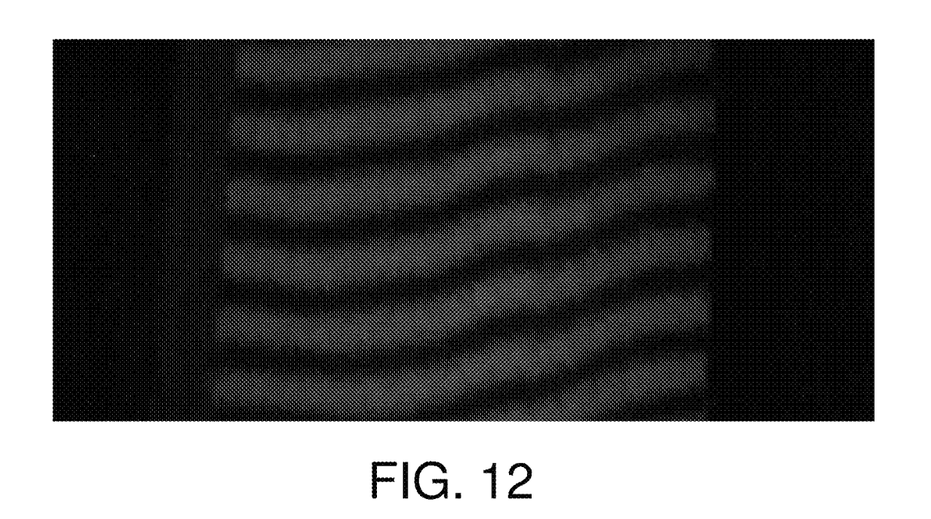
FIG. 12 is a photograph of a good fringe pattern.

Refer now to FIG. 12, a photograph of a good fringe pattern. In the current figure, the interferogram shows a maximum fringe jump is less than 0.3 of a fringe. This indicates an inhomogeneity of less than $1\times 10^{-4}$.

Figure 13:
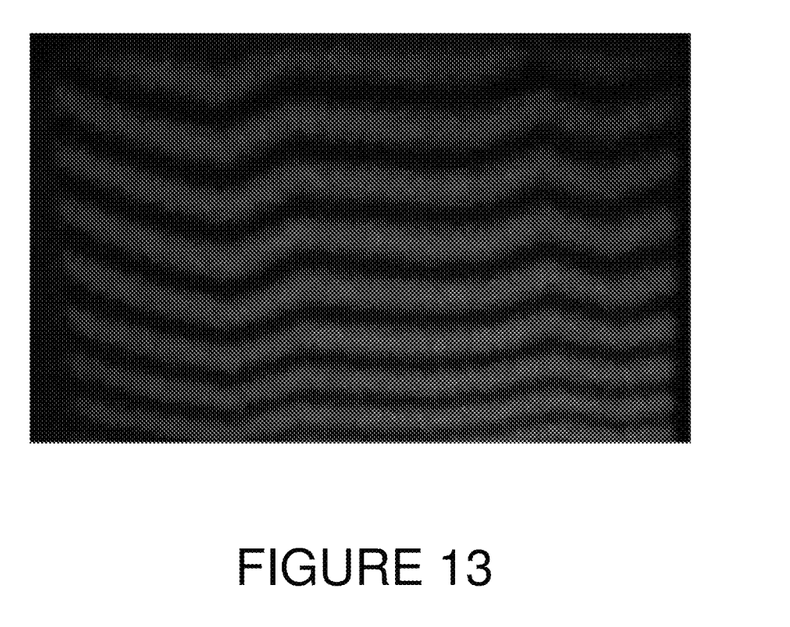
FIG. 13 is a photograph of a bad fringe pattern.

Refer now to FIG. 13, a photograph of a bad fringe pattern. In this example, the "bad" fringe pattern indicates an inhomogeneity greater than the maximum allowed inhomogeneity for the particular application of the device under test (LOE 20). On the left-hand side of the interferogram of the current figure, fringe jumps of almost a whole fringe can be seen. This corresponds to inhomogeneity of approximately 2×10-4.

Figure 14:
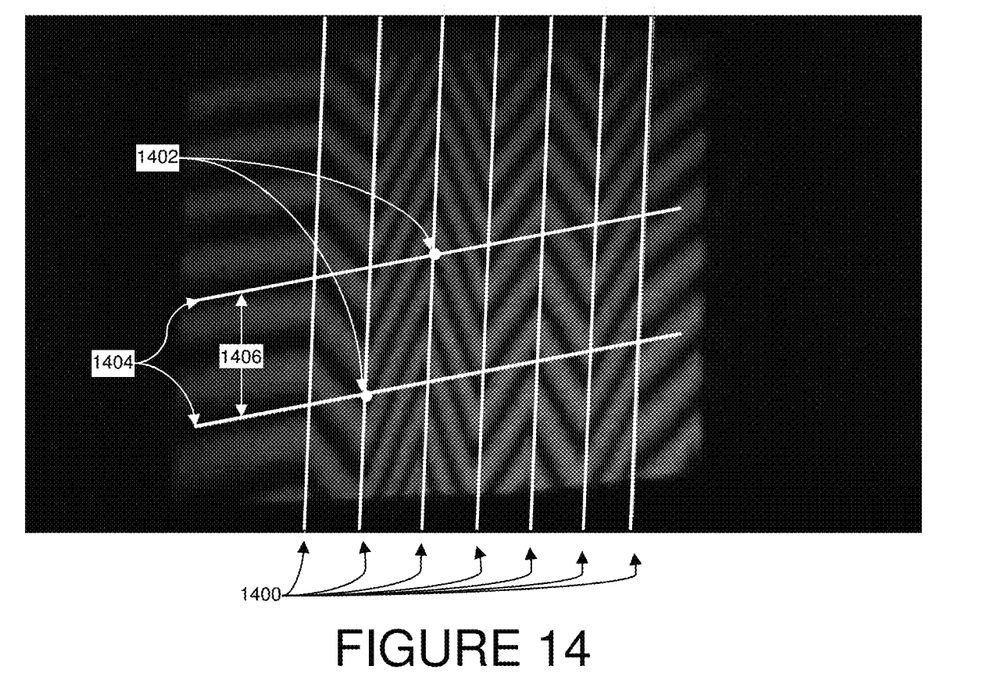
FIG. 14 is a photograph of a really bad fringe pattern.

Refer now to FIG. 14, a photograph of a really bad fringe pattern. This significant inhomogeneity results in noticeably visible jumps in a pattern viewed using the LOE 20 of this test.

The vertical lines 1400 drawn on the current figure denote the facet boundaries. The fringe separation, denoted by dots 1402, represents the maximum inhomogeneity. In the current interferogram, each of the six plates has noticeable differences in refractive index. In the worst case, the fringe jump is two whole fringes (fringe jump 1406 between horizontal lines 1404). This corresponds to an inhomogeneity of approximately 5×10-4.

Determining Fringe Jumps

Figure 15:
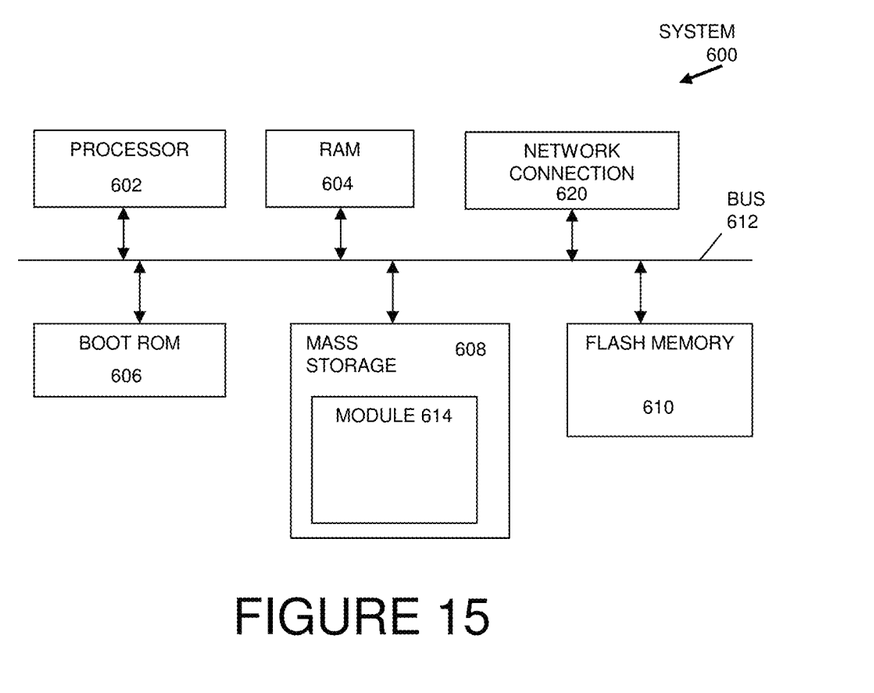
FIG. 15 is a high-level partial block diagram of an exemplary system configured to implement the processing module of the present invention.

Determining deviation between one or more portions of the fringes and another one or more portions of the fringes, corresponds to refractive index inhomogeneity between indices of refraction of the plates. The amount (number) of fringe jumps in an interferogram, and the resulting calculation of deviation (inhomogeneity), can be calculated using a variety of methods. As is known in the field of image processing, it is generally not possible for a human to perform the interpretation or calculation, and a processor (for example, processor 602) must be employed to accomplish the task, such as handling the quantity, accuracy, and/or complexity of calculation. Using software for interferogram analysis can facilitate these steps, and is normally required for implementation of a method of analyzing an interferogram to characterize discrepancies between adjacent plates in an LOE.

The current implementation includes a method for a non-contact measurement technique for determining the inhomogeneity of plates within a lightguide optical element (LOE), a qualitative assessment of an interferogram to determine inhomogeneity. The deviation of the fringes can be used to calculate a pass/fail metric of inhomogeneity for the LOE.

The generated interferogram shows fringes, or "wiggles" resulting from the pattern of wave interference of the input test rays.

The interferometric image can be analyzed in order to extract a pass/fail metric, referred to in the context of this document as "A quantitative Facet Index Delta" (AFID) metric. The metric can be between adjacent plates, and is typically a delta over all of the plates.

One exemplary implementation to analyze the interferogram and determine the amount of fringe jump between fringes is to extrapolate a portion of the fringe, do a best fit to the fringe, and then compare this extrapolation to another portion of the interferogram.

Another exemplary implementation is to extrapolate a fringe to build (generate) an "ideal" fringe. Then a calculation is done of departure (error, jump) of an actual fringe(s) from the interferogram compared to the "ideal" fringe. The measurement of departure can be in portions of a fringe. Then the measure of departure can be used to calculate the inhomogeneity of the LOE 20.

By way of example, the image (interferogram) is analyzed in a sequence that could include all or a subset of the steps of:

1. Analyze the interferogram to determine axes of the interferogram, i.e. direction of uniform path difference for a perfect LOE.
2. Image rotation transformation (this step can be done by image processing or by optical means).
3. Split the interferogram into N discrete signal arrays orthogonal to fringes, whereby N is significantly larger than the number of facets in the LOE, for example, an order of magnitude larger.
4. Calculate phase of signal arrays n=1 to N, by use of known phase extraction algorithms such as
   a. 3 or 4 bucket method,
   b. wavelet transform, or
   c. other known methods.
5. Plot phase as a function of n and determine maximum phase difference between overall maxima and minima in phase plot, i.e. calculate AFID metric.

In another embodiment, the AFID metric is calculated according to steps 1 to 4 above, and then pair wise calculated for each pair of adjacent slabs in an LOE.

While the current embodiment has been described with regard to an LOE lightguide 20, it is foreseen that based on this description, the disclosed techniques can be used to test other devices, such as devices including multiple plate construction and/or combinations of refractions.

FIG. 15 is a high-level partial block diagram of an exemplary system 600 configured to implement the processing module 1004 of the present embodiment. System (processing system) 600 includes a processor 602 (one or more) and four exemplary memory devices: a random-access memory (RAM) 604, a boot read only memory (ROM) 606, a mass storage device (hard disk) 608, and a flash memory 610, all communicating via a common bus 612. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 602 including but not limited to reduced instruction set computer (RISC) architecture and/or complex instruction set computer (CISC) architecture. A module (processing module) 614 is shown on mass storage 608, but as will be obvious to one skilled in the art, could be located on any of the memory devices.

Mass storage device 608 is a non-limiting example of a non-transitory computer-readable storage medium bearing computer-readable code for implementing the measuring technique methodology described herein. Other examples of such computer-readable storage media include read-only memories such as CDs bearing such code.

System 600 may have an operating system stored on the memory devices, the ROM may include boot code for the system, and the processor may be configured for executing the boot code to load the operating system to RAM 604, executing the operating system to copy computer-readable code to RAM 604 and execute the code.

Network connection 620 provides communications to and from system 600. Typically, a single network connection provides one or more links, including virtual connections, to other devices on local and/or remote networks. Alternatively, system 600 can include more than one network connection (not shown), each network connection providing one or more links to other devices and/or networks.

System 600 can be implemented as a server or client respectively connected through a network to a client or server.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A method for measuring refractive index inhomogeneity comprising:
   (a) projecting projected light onto a front surface of a lightguide, said lightguide including:
      (i) a first pair of external surfaces parallel to each other, said external surfaces including said front surface and a back surface, and
      (ii) a set of coated plates, said set of plates:
         (A) parallel to each other,
         (B) between said first pair of external surfaces, and
         (C) at a non-parallel angle relative to said first pair of external surfaces, and
      (iii) each of said plates having a corresponding index of refraction, and
   (b) capturing fringes of an interferogram image of an interference pattern to measure the refractive index inhomogeneity between said plates, said interference pattern between refracted/reflected light rays and externally reflected light,
      (i) said refracted/reflected light rays being a result of said projected light traversing through difference plates having same or different values of refractive index, reflecting internally from the back surface, and then exiting said lightguide via said front surface and
      (ii) said externally reflected light being a result of said projected light reflecting from said front surface.

2. The method of claim 1 wherein said projecting is at an oblique angle relative to said front surface.

3. The method of claim 1 wherein said interferogram image corresponds to refractive index inhomogeneity between said indices of refraction of said plates.

4. The method of claim 1 further including: determining deviation between one or more portions of said fringes and another one or more portions of said fringes, each of said portions corresponding to one or more of said plates, said deviation corresponding to refractive index difference between said indices of refraction of said plates.

5. The method of claim 4 wherein each of said portions of said fringes corresponds to one of said plates.

6. The method of claim 4 wherein said deviation is selected from the group consisting of:
   (a) between adjacent said plates,
   (b) across multiple said plates, and
   (c) across all said plates.

7. The method of claim 4 wherein said determining deviation includes determining how many fringe jumps are in said interferogram.

8. The method of claim 4 further including a step of calculating a pass/fail metric based on said deviation.

9. The method of claim 4 wherein said deviation is determined using at least one technique selected from the group consisting of:
   (a) analyzing said interferogram to determine axes of said interferogram,
   (b) rotating and/or transforming said interferogram,
   (c) splitting said interferogram into N discrete signal arrays orthogonal to said fringes, whereby N is significantly larger than the number of facets in the lightguide, and
   (d) calculating a phase of signal arrays n=1 to N, by use of a phase extraction algorithm.

10. The method of claim 9 wherein said at least one technique is said calculating a phase of signal arrays n=1 to N, by use of a phase extraction algorithm, said phase extraction algorithm selected from the group consisting of:
   (i) three or four bucket method, and
   (ii) wavelet transform.

11. The method of claim 4 wherein a pass/fail metric is derived from said deviation determined over an entirety of said interferogram, and then other pass/fail metrics are derived from deviations between adjacent said plates.

12. The method of claim 4 wherein said deviation is determined by:
   (a) splitting said interferogram into N discrete signal arrays orthogonal to said fringes,
   (b) calculating a phase of said signal arrays n=1 to N, by use of a phase extraction algorithm, and
   (c) plotting said phase as a function of n and determining maximum phase difference between overall maxima and minima in said phase plot.

13. The method of claim 4 wherein said deviation is determined:
   (a) using a portion of one of said fringes,
   (b) doing a best fit extrapolation to said portion of one of said fringes, and
   (c) comparing said extrapolation to another portion of said fringes.

14. The method of claim 4 wherein said deviation is determined by:
   (a) extrapolating one of said fringes to generate an ideal fringe,
   (b) calculating a departure of an actual one of said fringes from said ideal fringe.

15. The method of claim 4 wherein said projected light is collimated light that is slightly defocused.

16. The method of claim 4 wherein said projected light is monochrome light.

17. The method of claim 4 wherein said projected light is in the visible spectrum.

\* \* \* \* \*